United States Patent [19]

Serban et al.

[11] Patent Number: 5,630,553

[45] Date of Patent: May 20, 1997

[54] METHOD AND DEVICE FOR RECYCLING HETEROGENEOUS MIXTURES OF MATERIALS RESULTING FROM SIZE-REDUCTION PROCESSES

[75] Inventors: Petre Serban, Kassel; Siegmar Schäfer, Freiberg; Dietrich Häusler, Ahnatal; Hans-Joachim Bornemann, Vellmar; Wilfried Sinning, Baunatal; Ulrich Tölle, Hofgeismar, all of Germany

[73] Assignee: Thyssen Industrie AG, Essen, Germany

[21] Appl. No.: 435,227

[22] Filed: May 5, 1995

[30] Foreign Application Priority Data

May 6, 1994 [DE] Germany .............. 44 15 905.6

[51] Int. Cl.$^6$ ................................. B02C 19/00
[52] U.S. Cl. .......... 241/23; 241/24.14; 241/24.18; 241/65; 241/79.1; 241/DIG. 38
[58] Field of Search .................. 241/23, 24, 65, 241/79.1, 79, 170, DIG. 38, 24.12, 24.14, 24.18

[56] References Cited

U.S. PATENT DOCUMENTS

| | | | |
|---|---|---|---|
| 5,060,870 | 10/1991 | Trezek et al. | 241/19 |
| 5,148,993 | 9/1992 | Kashiwagi | 241/24 |
| 5,225,137 | 7/1993 | Sadr | 264/349 |
| 5,279,465 | 1/1994 | Stroppiana | 241/29 |
| 5,323,971 | 6/1994 | Nishibori et al. | 241/3 |
| 5,328,104 | 7/1994 | Lima et al. | 241/24 |
| 5,387,267 | 2/1995 | Warf et al. | 44/589 |
| 5,415,354 | 5/1995 | Shutov et al. | 241/16 |

FOREIGN PATENT DOCUMENTS

| | | |
|---|---|---|
| 4325948 | 1/1994 | Germany . |
| 4313977 | 4/1994 | Germany . |

OTHER PUBLICATIONS

H.B. Ries; Industrial applications . . . pelletizing disks—Part 1—; Jan. 1989; pp. 40–44.

*Primary Examiner*—John M. Husar
*Attorney, Agent, or Firm*—Robert W. Becker & Associates

[57] ABSTRACT

In a method for recycling heterogeneous mixtures of materials resulting from size-reduction processes the heterogeneous mixture of materials is comminuted to form a comminuted intermediate product from which in a subsequent step comminuted particles of a preset size are separated. The selected comminuted particles are subjected to an agglomeration treatment for producing agglomerate particle product of a preset degree of agglomeration having an upper limit with respect to agglomerate particle size. The apparatus for recycling heterogeneous mixtures of materials from size-reduction processes has a comminution device for comminuting a heterogeneous mixture of materials to form a comminuted intermediate product and an agglomeration device, connected downstream of the comminution device, for subjecting at least a portion of the intermediate product to the agglomeration treatment for producing agglomerate particle product of a preset degree of agglomeration having an upper limit with respect to agglomerate particle size.

15 Claims, 2 Drawing Sheets

METHOD AND DEVICE FOR RECYCLING HETEROGENEOUS MIXTURES OF MATERIALS RESULTING FROM SIZE-REDUCTION PROCESSES

BACKGROUND OF THE INVENTION

The invention relates to a method and a device for recycling of heterogeneous material mixtures resulting from size-reduction processes, especially unused material mixtures resulting from size-reduction with shredders, such as shredder light fractions.

From German Offenlegungsschrift 43 13 977 a method and device for recycling domestic plastic waste material is known. According to the disclosed method, the domestic plastic waste material is reduced in size and the metallic components are separated from the mixture, whereafter the mixture is subjected to a low-temperature melting treatment. As a final step small bodies (pellets) are formed that have a diameter of 5 to 10 mm which are then useable in further applications/production processor. The apparatus has components including an extruder with heated double worm gear for melting and kneading the plastic waste mixture and a device for forming the plastified material into pellets.

The aforedescribed technical disclosure is especially inefficient when the starting material is not exclusively comprised of plastic materials but a greatly heterogenous mixture of different materials and material groups.

It is therefore an object of the present invention to provide a method and a device for the treatment of heterogenous mixtures of materials resulting from a size-reduction process with which the heterogenous material mixtures can be processed and treated such that they can be reused.

SUMMARY OF THE INVENTION

The method for recycling heterogenous mixtures of materials resulting from size-reduction processes according to the present invention is primarily characterized by the following steps:

Comminuting a heterogeneous mixture of materials to form a comminuted intermediate product;

Separating from the intermediate product comminuted particles of a preset size; and Subjecting the selected comminuted particles to an agglomeration treatment for producing agglomerate particle product of a preset degree of agglomeration having an upper limit with respect to agglomerate particle size.

Preferably, the method further comprises the step of selecting the degree of agglomeration to be within a range of agglomerate particle size determined as a function of the intended use of the agglomerate particle product.

In another embodiment of the present invention, the method further comprises the step of selecting the degree of agglomeration such that the agglomerate particles can be individualized.

According to yet another embodiment of the present invention the method further comprises the step of selecting the degree of agglomeration as a function of adhesion resulting between the agglomerate particles of the same and different materials.

Advantageously, the method further comprises the step of returning particles of the intermediate product surpassing the preset size to the step of comminuting.

Advantageously, the step of separating from the intermediate product comminuted particles of a preset size includes the step of selecting a range of 5 mm to 10 mm for the preset size.

Expediently, the method further comprises the step of separating magnetic materials from the intermediate product.

Advantageously, the method further comprises the step of separating nonferrous materials from the intermediate product.

Preferably, the step of subjecting the selected comminuted particles to an agglomeration treatment includes the step of adding thermoplastic materials.

In a preferred embodiment of the present invention the method further comprises the step of separating magnetic materials from the agglomerate particle product.

The present invention further relates to an apparatus for recycling heterogenous mixtures of materials resulting from size-reduction processes. The inventive apparatus is primarily characterized by:

A comminution device for comminuting a heterogenous mixture of materials to form a comminuted intermediate product;

An agglomeration device, connected downstream of the comminution device, for subjecting at least a portion of the intermediate product to an agglomeration treatment for producing agglomerate particle product of a preset degree of agglomeration having an upper limit with respect to agglomerate particle size.

Advantageously, the comminution device is a rod mill.

Preferably, the agglomeration device comprises a heating mixer and a cooling mixer.

In another embodiment of the present invention the agglomeration device comprises a mixing device with a heating unit and a cooling unit.

Advantageously, the apparatus further comprises a corona roller separator for separating metal materials from the agglomerate particle product.

According to the present invention, the heterogeneous mixture of materials is subjected to comminution and from the resulting intermediate product particles of a preset particle size are separated which particles are subjected to an agglomeration treatment with a degree of agglomeration that is limited in the direction of increasing particle size.

The invention has the advantage that, as a result of the agglomeration treatment, an individualizable (separable) product of a certain particle size is provided and there is no need for subjecting the resulting agglomeration product to a further comminution process for further use (recycling application) thereof. Furthermore, it is possible to separate certain materials from the resulting agglomeration product when a certain preset agglomerate particles size is achieved because during the agglomeration treatment, in which the particle size is limited in the direction of increasing particle size, the adhesion energy between different materials, respectively, material groups is substantially lower than between materials of the same type, for example, between metals.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

Figure 1:
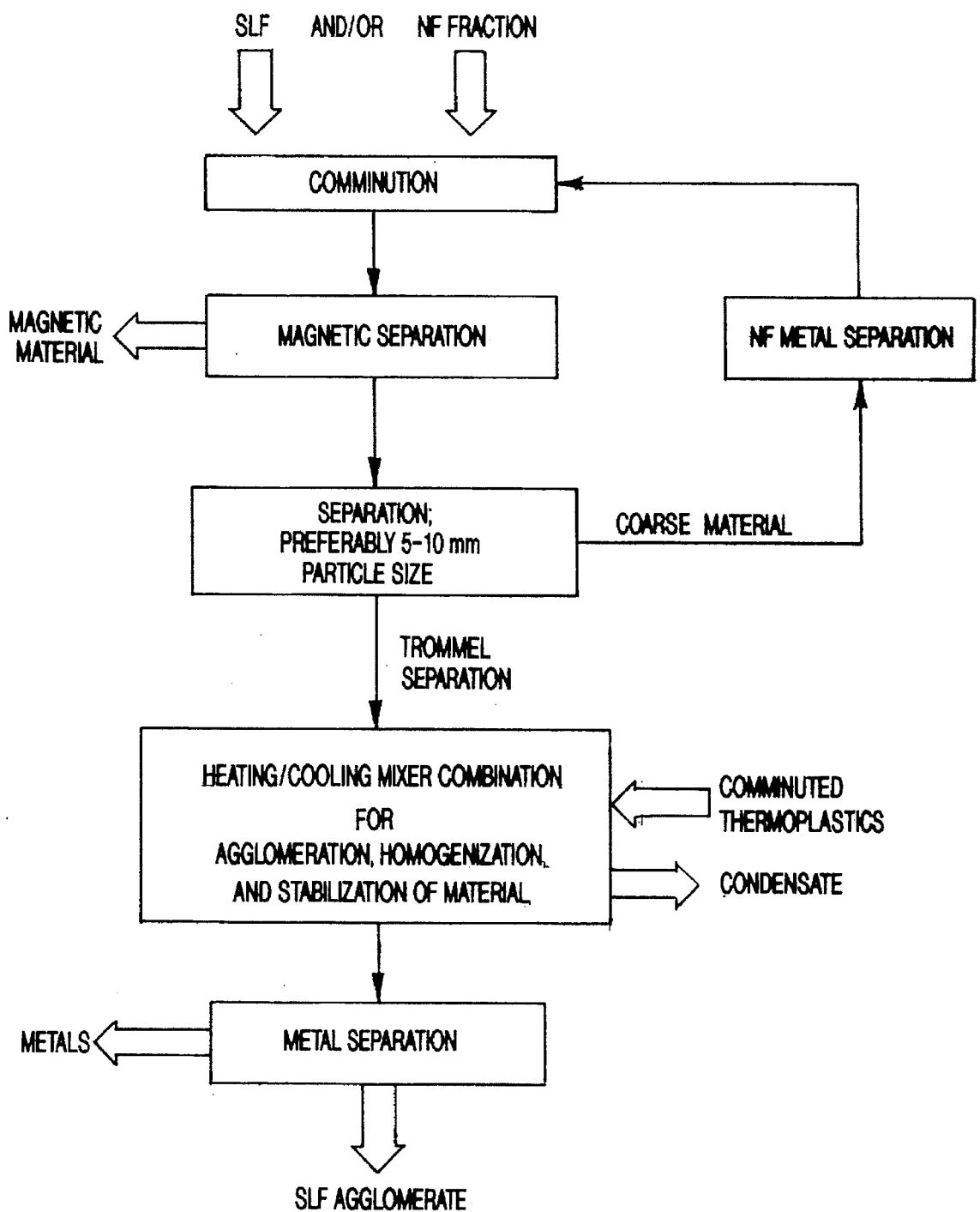
FIG. 1 shows a block diagram of the inventive method.
Figure 2:
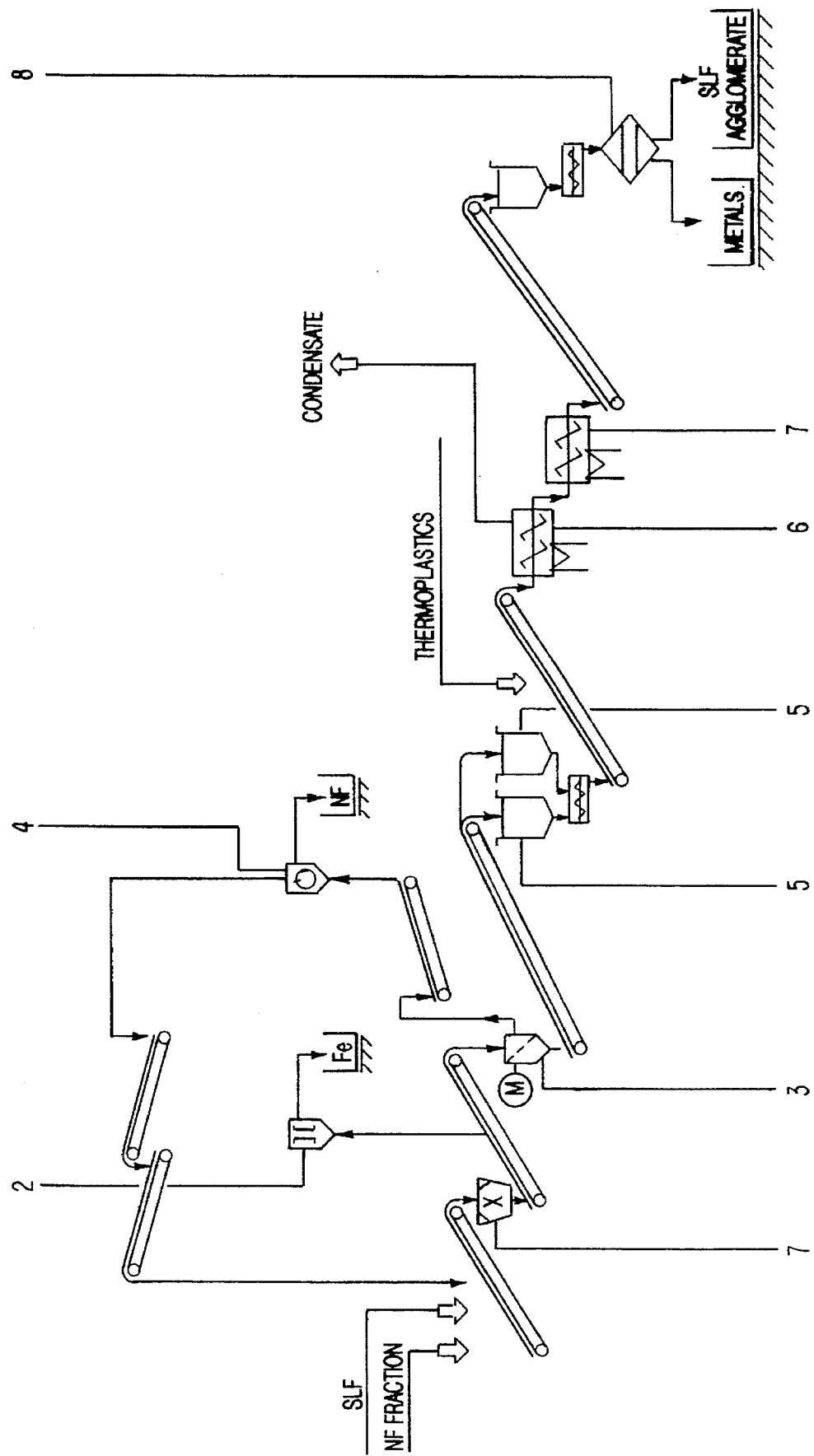
FIG. 2 shows a representation of the method of FIG. 1 with schematically represented apparatus components required for the method.

The present invention will now be described in detail with the aid of several specific embodiments utilizing FIGS. 1 and 2.

In the following the invention will be described in more detail with one particular embodiment in which the heterogeneous mixture of materials is in the form of the remaining product portions of a shredder process.

The remaining product portions can be classified as a nonferrous (NF) fraction and a shredder light fraction (SLF). Both fractions are subjected to a further comminution process whereby the comminution of the shredder light fraction (SLF) is preferably performed in a rod mill 1 (FIG. 2). Subsequent to the process of comminution, a magnetic separation with the aid of an overhead band magnet 2 is carried out followed by screening/separation of the materials. For separating of the material a trommel 3 is used which is set to a particle size of 5 mm to 10 mm. The coarse material which surpasses this preset particle size is guided through an eddy current separator 4 for nonferrous metal separation followed by a subsequent further comminution of the remaining material within the rod mill 1.

Once the particles of the coarse materials, optionally after multiple comminutions within the rod mill 1, fall below the upper preset particle size limit, they are intermediately stored together with the previously separated fine particles in a buffer storage facility in the form of storage bins 5. Subsequently, the agglomeration treatment is carried out in a heating mixer 6 and a cooling mixer 7 for homogenizing and stabilizing the materials. A mixing device that includes a heating unit and a cooling unit can be used instead of the separate mixers 6, 7.

The agglomeration treatment may be carried out with addition of thermoplastic material. The product resulting from the agglomeration treatment is an agglomerate particle product that can be individualized and from which especially metals can be separated in an uncomplicated fashion with a corona roller separator 8.

The present invention is, of course, in no way restricted to the specific disclosure of the specification and drawings, but also encompasses any modifications within the scope of the appended claims.

What we claim is:

1. A method for recycling heterogeneous mixtures of materials resulting from size-reduction processes, said method comprising the steps of:
   comminuting a heterogenous mixture of materials to form a comminuted intermediate product;
   separating from the intermediate product comminuted particles of a preset size; and
   subjecting the selected comminuted particles to an agglomeration treatment for producing agglomerate particles of a preset degree of agglomeration having an upper limit with respect to agglomerate particle size, said agglomerate particles being individualizable according to the different materials of the heterogeneous mixture.

2. A method according to claim 1, further comprising the step of selecting the degree of agglomeration to be within a predetermined range of agglomerate particle size based on the intended use of the agglomerate particles.

3. A method according to claim 1, further comprising the step of selecting the degree of agglomeration based on adhesion between the agglomerate particles of the same and different materials.

4. A method according to claim 1, further comprising the step of returning particles of the intermediate product surpassing the preset size to the step of comminuting.

5. A method according to claim 1, wherein the step of separating from the intermediate product comminuted particles of a preset size includes the step of selecting a range of 5 mm to 10 mm for the preset size.

6. A method according to claim 1, further comprising the step of separating magnetic materials from the intermediate product.

7. A method according to claim 1, further comprising the step of separating nonferrous materials from the intermediate product.

8. A method according to claim 1, wherein the step of subjecting the selected comminuted particles to an agglomeration treatment includes the step of adding thermoplastic materials.

9. A method according to claim 1, further comprising the step of separating magnetic materials from the agglomerate particles.

10. A method for recycling heterogeneous mixtures of materials resulting from size-reduction processes, said method comprising the steps of:
    comminuting a heterogenous mixture of materials to form a comminuted intermediate product;
    separating from the intermediate product comminuted particles of a preset size;
    subjecting the selected comminuted particles to an agglomeration treatment for producing agglomerate particles of a preset degree of agglomeration having an upper limit with respect to agglomerate particle size; and
    selecting the degree of agglomeration so as to individualize the agglomerate particles according to the different materials of the heterogeneous mixture.

11. An apparatus for recycling heterogeneous mixtures of materials resulting from size-reduction processes, said apparatus comprising:
    a comminution device for comminuting a heterogenous mixture of materials to form a comminuted intermediate product;
    an agglomeration device, connected downstream of said comminution device for subjecting at least a portion of the intermediate product to agglomeration treatment for producing agglomerate particles of a preset degree of agglomeration having an upper limit with respect to agglomerate particle size, said agglomerate particles being individualizable according to the different materials of the heterogeneous mixture.

12. An apparatus according to claim 11, wherein said comminution device is a rod mill.

13. An apparatus according to claim 11, wherein said agglomeration device comprises a heating mixer and cooling mixer.

14. An apparatus according to claim 11, wherein said agglomeration device comprises a mixing device with a heating unit and a cooling unit.

15. An apparatus according to claim 11, further comprising a corona roller separator for separating metal materials from the agglomerate particles.

* * * * *